US010677305B2

(12) United States Patent
Unno et al.

(10) Patent No.: US 10,677,305 B2
(45) Date of Patent: Jun. 9, 2020

(54) FRICTION MATERIAL COMPOSITION, AND FRICTION MATERIAL AND FRICTION MEMBER USING FRICTION MATERIAL COMPOSITION

(71) Applicant: JAPAN BRAKE INDUSTRIAL CO., LTD., Hachioji-shi, Tokyo (JP)

(72) Inventors: Mitsuo Unno, Hachioji (JP); Masamichi Mitsumoto, Koganei (JP)

(73) Assignee: JAPAN BRAKE INDUSTRIAL CO., LTD., Tokyo (JP)

( * ) Notice: Subject to any disclaimer, the term of this patent is extended or adjusted under 35 U.S.C. 154(b) by 88 days.

(21) Appl. No.: 15/547,674

(22) PCT Filed: Jan. 26, 2016

(86) PCT No.: PCT/JP2016/052158
§ 371 (c)(1),
(2) Date: Jul. 31, 2017

(87) PCT Pub. No.: WO2016/121748
PCT Pub. Date: Aug. 4, 2016

(65) Prior Publication Data
US 2018/0045262 A1 Feb. 15, 2018

(30) Foreign Application Priority Data

Jan. 29, 2015 (JP) ................................. 2015-015812
Jan. 29, 2015 (JP) ................................. 2015-015813

(51) Int. Cl.
*F16D 69/02* (2006.01)
*F16D 65/092* (2006.01)

(52) U.S. Cl.
CPC ......... *F16D 69/026* (2013.01); *F16D 65/092* (2013.01); *F16D 2200/0021* (2013.01); *F16D 2200/0034* (2013.01); *F16D 2200/0065* (2013.01); *F16D 2200/0069* (2013.01)

(58) Field of Classification Search
CPC ..... F16D 69/025; F16D 69/026; F16D 69/027
See application file for complete search history.

(56) References Cited

U.S. PATENT DOCUMENTS

| 7,901,659 | B2 * | 3/2011 | Itoi | C01G 23/005 |
| | | | | 423/594.15 |
| 2012/0070680 | A1 * | 3/2012 | Unno | F16D 69/026 |
| | | | | 428/549 |
| 2014/0342899 | A1 | 11/2014 | Itami et al. | |
| 2016/0245353 | A1 | 8/2016 | Hanaie et al. | |
| 2016/0273604 | A1 | 9/2016 | Miyaji et al. | |
| 2016/0289126 | A1 | 10/2016 | Kitami et al. | |
| 2016/0289442 | A1 | 10/2016 | Takada et al. | |

FOREIGN PATENT DOCUMENTS

| CN | 104099065 A | * 10/2014 |
| JP | 2001-107026 A | 4/2001 |
| JP | 2001-107027 A | 4/2001 |
| JP | 2013-076058 A | 4/2013 |
| JP | 2013-185016 A | 9/2013 |
| JP | 2014-025014 A | 2/2014 |
| JP | 2014-148569 A | 8/2014 |
| JP | 2014-196445 A | 10/2014 |
| JP | 2015-093933 A | 5/2015 |
| JP | 2015-093934 A | 5/2015 |
| JP | 2015-093936 A | 5/2015 |
| WO | 2014/034878 A1 | 3/2014 |

OTHER PUBLICATIONS

Machine translation of CN 104099065 A, published Oct. 15, 2014. (Year: 2014).*
Apr. 12, 2016 Search Report issued in International Patent Application No. PCT/JP2016/052158.
Apr. 12, 2016 Written Opinion issued in International Patent Application No. PCT/JP2016/052158.

\* cited by examiner

*Primary Examiner* — Vickey Nerangis
(74) *Attorney, Agent, or Firm* — Oliff PLC

(57) ABSTRACT

The friction material composition, friction material and friction member are provided, in which copper, having serious environmental effects, is not contained or is not contained at more than 0.5 mass % of copper, rust adhering force is low, rust delamination is difficult to occur, the friction material composition includes a binder, an organic filler, an inorganic filler, and a fibrous substrate, wherein the friction material composition contains no copper as an element or contains not more than 0.5 mass % of copper, and contains fibrillated aramid fiber as the fibrous substrate, 0.2 to 2 mass % of sodium carbonate and 2.5 to 10 mass % of calcium hydroxide.

7 Claims, 1 Drawing Sheet

FRICTION MATERIAL COMPOSITION, AND FRICTION MATERIAL AND FRICTION MEMBER USING FRICTION MATERIAL COMPOSITION

TECHNICAL FIELD

The present invention relates to friction material compositions, and in particular, relates to a nonasbestos friction material composition containing binder, organic filler, inorganic filler and fibrous substrates and substantially not containing asbestos. Furthermore, the present invention relates to a friction material and a friction member in which the friction material composition is used.

BACKGROUND ART

Friction materials such as for disk braking pads, braking linings or the like are used for braking of vehicles. The friction material functions in braking by producing friction on a facing material such as disk rotor, braking drum or the like. Therefore, a superior friction coefficient, abrasion resistance (long service life of friction material), strength, sound and vibration properties (braking noises and abnormal noises are difficult to generate) and the like are required for the friction material. The friction coefficient is required to be reliable regardless of vehicle velocity, deceleration and braking temperature. In addition, there may be a case in which the friction material adheres to the facing material by rust generated at a friction interface, and problems such as abnormal noises at starting of driving, surface delamination of the friction material (rust delamination) and the like occur. In order to solve the problem of adhesion due to rust, a friction material composition is proposed in which zinc functioning as a sacrificial anode or an alkaline metal salt increasing pH is added (see Patent sacrificial anode or an alkaline metal salt increasing pH is added (see Patent Documents 1 and 2).

In the friction material, a friction material composition containing binder, fibrous substrate, inorganic filler, organic filler and the like is used, and in order to exhibit the abovementioned properties, a friction material composition containing one or more kinds selected from the above ingredients is generally used. In particular, copper is added to a friction material in the form of fiber or powder, and is an effective component for maintaining friction coefficient under braking conditions at high temperatures (anti-fade property), improving abrasion resistance at high temperatures, and improving strength of friction material. However, a friction material containing copper may generate abrasion powder containing copper during braking, and it may be a cause of contamination of rivers, lakes and oceans. Therefore, there is a tendency to limit use of copper.

Under recent circumstances limiting use of copper, the following Patent Document 3 discloses a technique of adding potassium titanate having multiple convex portions and biodegradable inorganic fiber as a method to improve strength and abrasion resistance in a composition not containing copper.

The Patent Documents are as follows:
Patent Document 1: Japanese Unexamined Patent Application Publication No. 2001-107026
Patent Document 2: Japanese Unexamined Patent Application Publication No. 2001-107027
Patent Document 3: Japanese Unexamined Patent Application Publication No. 2013-076058.

The friction material not containing copper that is harmful to the environment has low material strength, and there is a problem of rust delamination. The rust-proofing effect proposed in the Patent Documents 1 and 2 and the strength improving technique of friction material in a composition not containing copper proposed in the Patent Document 3 are not sufficient to improve effects against rust delamination of the friction material not containing copper.

SUMMARY OF THE INVENTION

The present invention was completed in view of the above circumstances, and an object of the present invention is to provide a friction material in which rust adhering and rust delamination are low even in a friction material containing no copper that is harmful to the environment or containing copper at not more than 0.5 mass %.

The inventors have found that by containing a specific amount of combination of calcium hydroxide and sodium carbonate in a composition containing fibrillated aramid fibers in order to improve material strength of the friction material and not containing copper, rust adhering force can be effectively reduced and rust delamination can be effectively prevented. That is, the inventors have found that calcium hydroxide not only has high pH and rust proofing effect on a friction facing material, but it also functions as a hardening catalyst of phenol resin during formation of the friction material and improves strength of the friction material; however, excessive addition of calcium hydroxide may reduce strength of the fibrillated aramid resin. Furthermore, as a result of research on ranges of addition amount of calcium hydroxide which exhibit maximal effects of reducing rust adhering force and restraining rust delamination and as a result of addition of a specific amount of sodium carbonate which is readily soluble and has lower pH when dissolved in water compared to calcium hydroxide, the inventors have found that it is possible to achieve great reduction of reducing rust adhering force and restraining rust delamination in a composition not containing copper by a synergetic effect of pH of calcium hydroxide, friction material strength improving effect and the addition of specific amount of sodium carbonate.

Furthermore, the inventors have also found that by dispersing powdered zinc in addition to calcium hydroxide in the friction material, zinc may be ductilized on the friction interface during braking, rust proofing effect may be exhibited on the entire friction interface by an action of sacrificial anode of zinc ductilized on the friction interface, and it is possible to achieve great effects of reducing rust adhering force and restraining rust delamination in a composition not containing copper by a synergetic effect of pH of calcium hydroxide, friction material strength improving effect and the dispersion of zinc.

Furthermore, the inventors have also found that by adding a specific amount of steel fiber which improves friction material strength and reduces amount of rust and potassium titanate having multiple convex portions which also improves friction material strength, it is possible to further improve the effects of reducing rust adhering force and restraining rust delamination in the friction material composition of the present invention.

The friction material composition of the present invention based on the above knowledge includes a binder, an organic filler, an inorganic filler, and a fibrous substrate, wherein the friction material composition does not contain copper as an element, or contains not more than 0.5 mass % of copper, the fibrous substrate contains fibrillated aramid fiber, and the inorganic filler contains 0.2 to 2 mass % of sodium carbonate and 2.5 to 10 mass % of calcium hydroxide.

In addition, the friction material composition of the present invention includes a binder, an organic filler, an inorganic filler, and a fibrous substrate, wherein the friction material composition does not contain copper as an element, or contains not more than 0.5 mass % of copper, the fibrous substrate contains fibrillated aramid fiber, and the inorganic filler contains powdered zinc and 2.5 to 10 mass % of calcium hydroxide.

In the present invention, it is desirable that the amount of the powdered zinc be 1 to 10 mass %, and particle diameter of the powdered zinc be 10 to 500 μm. Furthermore, it is desirable that the inorganic filler contains sodium carbonate.

In each of the above friction material compositions of the present invention, it is desirable that the fibrous substrate contain 2 to 8 mass % of steel fiber and the inorganic filler contain potassium titanate having multiple convex portions.

Next, the friction material of the present invention is formed by forming one of the abovementioned friction material compositions. In addition, the friction member is formed by friction material formed by one of the abovementioned friction material compositions and a backing metal.

According to the present invention, the friction material composition, friction material and friction member can be provided, in which rust adhering force and rust delamination are low even if copper harmful to the environment is not used, when they are used for friction materials such as for braking pads or the like for vehicles.

EXPLANATION OF REFERENCE NUMERALS

Figure 1A:
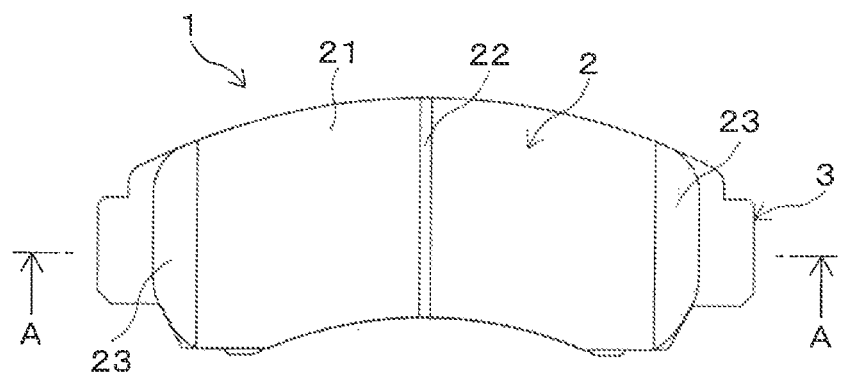
FIG. 1A is a plan view showing one example of a braking pad (friction member) according to the one embodiment of the present invention.

1: braking pad (friction member)
2: friction material
22: slit
23: chamfer
3: backing metal
4: adhesive layer

BEST MODE FOR CARRYING OUT THE INVENTION

Hereinafter, the friction material composition and the friction material and the friction member using the same of the present invention are explained in detail. It should be noted that the friction material composition of the present invention is a so-called non-asbestos friction material composition that does not contain asbestos substantially.

[Friction Material Composition]

The friction material composition of the present invention contains no copper as an element, or if copper is contained, contains not more than 0.5 mass %. That is, copper and a copper alloy, which are harmful to the environment, are not substantially contained, and the content amount of copper as an element in the friction material composition is not more than 0.5 mass %, desirably 0 mass %. As a result, even in a case in which abrasion powder is generated during braking, contamination will not occur in rivers, lakes, and oceans. It should be noted that "copper as an element" means content ratio of copper element contained in copper, copper alloy and copper compound in the form of fiber, powder or the like in the entire friction material composition.

The friction material composition of the present invention, as mentioned above, contains binder, organic filler, inorganic filler and fibrous substrate, and the friction material composition contains no copper as an element, or contains not more than 0.5 mass % of copper, the fibrous substrate contains fibrillated aramid fiber, and the inorganic filler contains 0.2 to 2 mass % of sodium carbonate and 2.5 to 10 mass % of calcium hydroxide.

In addition, the friction material composition of the present invention, as mentioned above, contains binder, organic filler, inorganic filler and fibrous substrate, and the friction material composition contains no copper as an element, or contains not more than 0.5 mass % of copper, the fibrous substrate contains fibrillated aramid fiber, and the inorganic filler contains powdered zinc and 2.5 to 10 mass % of calcium hydroxide.

In addition, in the friction material composition of the present invention, as mentioned above, it is desirable that the fibrous substrate contain 2 to 8 mass % of steel fiber and the inorganic filler contain potassium titanate having multiple convex portions.

Hereinafter the additional components are explained.

(Fibrillated Aramid Fiber/Fibrous Substrate)

The fibrillated aramid fiber contained as the fibrous substrate in the friction material composition of the present invention has multiple branched portions and BET specific surface area of 5 to 15 m$^2$/g. Practically, Twaron 1099, 1095, 3091 produced by TEIJIN LIMITED, Kevlar 1F538, 1F1710 produced by DU PONT TORAY CO., LTD. and the like can be mentioned. Since the fibrillated aramid fiber used in the present invention has high fiber strength and numerous branched portions, friction material strength can be effectively improved even in a composition not containing copper; however, strength may be reduced by hydrolysis if it is exposed to an aqueous solution having high pH for a long time.

(Calcium Hydroxide/Inorganic Filler)

The friction material composition of the present invention contains a specific amount of calcium hydroxide as the inorganic filler. Calcium hydroxide not only has high pH and rust proofing effect of the friction facing material, but it also functions as a hardening catalyst of phenol resin during formation of the friction material and improves strength of the friction material. Not less than 2.5 mass % of calcium hydroxide is added to obtain this effect. On the other hand, strength of fibrillated aramid resin may be reduced if excess amount of calcium hydroxide is added. Therefore, the amount of calcium hydroxide contained is not more than 10 mass %.

(Sodium Carbonate/Inorganic Filler)

In addition to calcium hydroxide, by containing sodium carbonate which is readily soluble and has lower pH than calcium hydroxide, rust proofing effect and strength improving effect of the friction material by calcium hydroxide can be improved further, rust adhering force can be greatly reduced in the composition not containing copper and rust delamination can be effectively restrained. Not less than 0.2 mass % of sodium carbonate is added to obtain these effects. On the other hand, pH may be increased and strength of fibrillated aramid resin may be reduced if excess amount of sodium carbonate is added. Therefore, the amount of sodium carbonate contained is not more than 2 mass %.

As the abovementioned calcium hydroxide and sodium carbonate, powder calcium hydroxide and sodium carbonate which have been used for an ordinary friction material composition can be used. Furthermore, from the viewpoint of water solubility, powder calcium hydroxide and sodium carbonate having finer particle diameter are desirable, and in particular, it is desirable to use powder of not more than 100 μm.

(Zinc Powder/Inorganic Filler)

The powdered zinc contained as the inorganic filler in the friction material composition of the present invention may be in a condition in which it is ductilized on the friction interface of the friction material during braking and covers the friction interface. Since zinc is easily oxidized, zinc covering the friction interface is selectively oxidized by sacrificial anode action, and oxidization of other components in the friction material, that is, rust is prevented from occurring. Thus, rust is prevented from occurring on the entire friction interface. As the powdered zinc, powdered zinc which is produced by atomizing or the like and which has been used for an ordinary friction material composition can be used. From the viewpoint of rust proofing effect by ductilizing on the friction material surface, finer particle diameter is more desirable. It is desirable for it to be 10 to 500 μm and more desirably 10 to 100 μm. Furthermore, it is desirable that content amount of zinc be not less than 1 mass % from the viewpoint of rust proofing effect, and more desirable that it be 2 mass %. On the other hand, abrasion resistance of the friction material in use at high temperature may be deteriorated if excess amount of zinc is added. Therefore, the amount of zinc contained is desirably not more than 10 mass % and more desirable that it be 8 mass %.

(Steel Fiber/Fibrous Substrate)

As the steel fiber which is desirable to be contained as the fibrous substrate in the friction material composition of the present invention, a straight fiber which can be produced by a chatter vibration cutting method or the like and a curled fiber which can be produced by cutting of long fiber or the like can be mentioned. The straight fiber has a linear fiber shape, and the curled fiber has a curved shape. The curled fiber includes simple circular shape, undulated shape, spiral shape, gurge shape or the like.

Regardless of the straight fiber and the curled fiber, this kind of steel fiber not only disperses friction heat on the friction interface and restrains uneven temperature increase, but it also has an effect of appropriately cleaning decomposed organic material that is generated on the friction interface. Therefore, variation of braking torque occurring during braking can be reduced and braking vibration can be restrained. It should be noted that the curled fiber is less likely to fall off the friction interface of the friction material, and it is desirable from the viewpoint of maintaining friction properties during braking at high temperature. Furthermore, as the curled fiber, a fiber having a portion in which the curvature radius is not more than 100 μm is more desirable since it adheres to the friction material more, and the friction material is less likely to fall off from the friction interface. As the curled steel fiber, commercially available steel fiber such as cut wool produced by NIHON STEEL WOOL Co., Ltd. or the like can be used.

The steel fiber improves strength of the friction material and reduces rust delamination; however, excessive addition may increase rust adhering force since the steel fiber itself becomes rusted. Therefore, the amount contained of the steel fiber 2 to 8 mass % can achieve both reducing of rust adhering force and restraining rust delamination in the friction material composition of the present invention. It is desirable that fiber diameter of the steel fiber be not more than 100 μm from the viewpoint of abrasion resistance at high temperature. Furthermore, it is desirable that fiber length of the steel fiber be not more than 2500 μm from the viewpoint of abrasion resistance at high temperature.

(Potassium Titanate Having Multiple Convex Portions/Inorganic Filler)

In the friction material composition of the present invention, a titanate salt which has been used in an ordinary friction material composition can be used as the inorganic filler. Titanate salt contributes to reduce braking vibration and rotor abrasion amount during braking at high temperature in the composition not containing copper. As the titanate salt, it is desirable to use potassium titanate having multiple convex portions. The potassium titanate having multiple convex portions in the present invention means potassium titanate having indefinite shape in which multiple convex portions extend to random directions, and is known that it can be used as a friction controlling material (see Patent Document 3). Practically, "TerracessJP" produced by Otsuka Chemical Co., Ltd. can be mentioned.

Such potassium titanate having indefinite shape in which multiple convex portions extending in random directions is effective for improving strength of friction material due to its convex portions. In particular, it is effective to restrain rust delamination of the friction material composition of the present invention. It is desirable that amount of potassium titanate having multiple convex portions contained in the friction material composition of the present invention be 1 to 30 mass % from the viewpoint of restraining rust delamination, and more desirably 1 to 20 mass %.

Next, the binder, the organic filler and the inorganic filler and the fibrous substrate other than the above explanation are mentioned as follows.

(Binder)

The binder is used for unifying the organic filler, the inorganic filler, the fibrous substrate and the like contained in the friction material composition together, and for imparting strength. The binder contained in the friction material composition of the present invention is not limited in particular, and a thermosetting resin, which is commonly used as a binder for friction material, can be used.

As such a thermosetting resin, for example, phenol resin; elastomer dispersed phenol resin such as acryl elastomer dispersed phenol resin and silicone elastomer dispersed phenol resin; modified phenol resin such as acryl-modified phenol resin, silicone-modified phenol resin, cashew-modified phenol resin, epoxy-modified phenol resin and alkylbenzene-modified phenol resin and the like can be mentioned. These resins can be used alone or in combination of two kinds or more. In particular, phenol resin, acryl-modified phenol resin, silicone-modified phenol resin, and alkylbenzene-modified phenol resin are desirable due to their superior heat resistance, formability and friction coefficient.

It is desirable that the amount of the binder contained in the friction material composition in the present invention be 5 to 20 mass %, and more desirably be 5 to 10 mass %. In the case in which the amount of the binder contained is 5 to 20 mass %, strength degradation of the friction material can be reduced. In addition, porosity of the friction material is reduced and elasticity is increased, that is, sound and vibration properties such as squeaking noises due to increased elasticity coefficient can be reduced further.

(Organic Filler Material)

The organic filler is added as a friction controlling material for improving sound and vibration properties, abrasion resistance and the like of the friction material. The organic filler contained in the friction material composition of the present invention is not particularly limited as long as the filler exhibits the abovementioned properties. Cashew dust, rubber component or the like, which is commonly used as an organic filler, can be used.

The cashew dust which is obtained by hardening cashew nut shell oil and breaking the hardened oil, and which is generally used as a friction material, can be selected.

As the rubber component, for example, acryl rubber, isoprene rubber, NBR (acrylonitrile-butadiene rubber), SBR (styrene-butadiene rubber), chlorinated butyl rubber, butyl rubber, silicone rubber or the like can be mentioned, and in addition, tire rubber or the like which is obtained from abandoned tires can be used as the rubber component. These types of rubbers may be used alone or in combination of two or more kinds.

It is desirable that the amount of the organic filler contained in the friction material composition in the present invention be 1 to 20 mass %, and more desirably be 1 to 10 mass % and further desirably be 3 to 8 mass %. In the case in which the content amount of the organic filler is 1 to 20 mass %, increased elasticity coefficient of the friction material and sound and vibration properties degradation, such as squeaking, can be avoided. In addition, heat resistance degradation and strength degradation due to thermal history can be avoided.

(Inorganic Filler Material)

The inorganic filler is added as a friction controlling agent for avoiding heat resistance degradation of the friction material and for improving abrasion resistance and friction coefficient. The inorganic filler contained in the friction material composition of the present invention is not limited in particular, as long as the filler is generally used as an inorganic filler for a friction material.

As the inorganic filler, for example, mica, tin sulfide, molybdenum disulfide, iron sulfide, antimony trisulfide, bismuth sulfide, zinc sulfide, calcium oxide, barium sulfate, coke, graphite, mica, vermiculite, calcium sulfate, talc, clay, zeolite, mullite, chromite, titanium oxide, magnesium oxide, silica, dolomite, calcium carbonate, magnesium carbonate, y alumina, zirconium silicate, manganese dioxide, zinc oxide, cerium oxide, zirconia or the like can be used. These may be used alone or in combination of two or more kinds. Furthermore, in addition to the abovementioned potassium titanate having multiple convex portions, granular or tabular titanate can be used in combination. As the granular or tabular titanate, potassium 6-titanate, potassium 8-titanate, lithium potassium titanate, magnesium potassium titanate, sodium titanate or the like can be used.

It is desirable that content amount of the inorganic filler in the friction material composition in the present invention be 30 to 80 mass %, and more desirably be 40 to 70 mass % and further desirably be 50 to 60 mass %. In the case in which the content amount of the organic filler is 30 to 80 mass %, heat resistance degradation can be avoided, and balance of content amount of other components of the friction material may be desirable.

(Fibrous Substrate Material)

The fibrous substrate material functions as a support in the friction material. In the friction material composition in the present invention, inorganic fiber, metallic fiber, organic fiber, carbon type fiber or the like which is usually used as a fibrous substrate material can be selected, and these may be used alone or in combination of two or more kinds.

As the inorganic fiber, ceramic fiber, biodegradable ceramic fiber, mineral fiber, glass fiber, silicate fiber or the like may be used alone or in combination of two or more kinds. Among these inorganic fibers, biodegradable mineral fiber containing $SiO_2$, $Al_2O_3$, CaO, MgO, FeO, $Na_2O$ or the like in freely chosen combination is desirable, and as a commercially available product, Roxul series produced by LAPINUS FIBERS B.V or the like may be mentioned.

The metallic fiber is not limited in particular as long as it is usually used in a friction material, for example, other than zinc powder mentioned above, fiber of elemental metal or alloy other than copper and copper alloy such as aluminum, iron, tin, titanium, nickel, magnesium, silicon or the like, and fibers of cast iron, that is, fibers mainly containing metal can be used.

As the organic fiber, other than the fibrillated aramid fiber mentioned above, aramid fiber not having branching such as chopped aramid fiber or the like, cellulose fiber, acryl fiber, phenol resin fiber or the like may be used alone or in combination of two or more kinds.

As the carbon type fiber, flameproofed fiber, pitch type carbon fiber, PAN type carbon fiber, activated carbon fiber or the like may be used alone or in combination of two or more kinds.

It is desirable that the amount of the fibrous substrate contained in the friction material composition in the present invention be 5 to 40 mass %, and more desirably be 5 to 20 mass %, and furthermore desirably be 5 to 15 mass %. In the case in which the content amount of the organic filler is 5 to 40 mass %, appropriate porosity as a friction material is obtained, squeaking is avoided, appropriate material strength is obtained, abrasion resistance is exhibited, and superior formability is obtained.

[Friction Material]

The friction material of the present invention can be produced by a forming method using the abovementioned friction material composition of the present invention, and can be employed as a friction material such as for a disk braking pad, braking lining or the like of vehicles.

The friction material of the present invention can be produced by a commonly known forming method using the friction material composition of the present invention, and desirably by a heating pressing forming method. In detail, for example, the friction material is produced by the following method in which the friction material composition of the present invention is uniformly mixed by using a mixing apparatus such as Loedige (trademark) mixer, pressing kneader or Eirich (trademark) mixer; the mixture is preliminary formed in a forming mold; the preliminarily formed material obtained is formed at a forming temperature of 130 to 160° C., forming pressure of 20 to 50 MPa, and forming time of 2 to 10 minutes; and the formed material obtained is heat treated at 150 to 250° C. for 2 to 10 hours. Furthermore, if necessary, coating, scorch treatment or polishing treatment is performed.

[Friction Member]

The friction member of the present embodiment is made as the member having the above friction material as a friction surface. As the friction member, for example, one of the following structures can be mentioned.

(1) A structure having only the friction material.

(2) A structure having a backing metal and the friction material formed by the friction material composition of the present invention arranged on the backing metal as a friction surface.

(3) A structure having a primer layer and an adhesive layer between the backing metal and the friction material in addition to the structure of (2), wherein the primer layer is for a purpose of surface modification of the backing metal for improving adhesive effect of the backing metal, and the adhesive layer is for a purpose of adhesion between the backing metal and the friction material.

The backing metal is usually used as a friction member to improve mechanical strength of the friction member. As material of the backing metal, metal or fiber reinforced plastic or the like, particularly iron, stainless steel, inorganic fiber reinforced plastic, carbon fiber reinforced plastic or the like may be mentioned. As the primer layer and the adhesive layer, one which is usually used in a friction member such as brake shoe may be selected.

Not only can the friction material composition of the present invention be formed to be used as an overlay material such as for a disk brake pad or brake lining of vehicles since the friction material composition has low rust adhesion force and rust delamination, but it can also be formed and used as an underlay material of a friction member. It should be noted that the overlay material means a friction material corresponding to a friction surface of a friction member, and the underlay material means a layer which exists between a friction material corresponding to a friction surface of a friction member and a backing metal and which has a purpose for improving shear strength, crack resistance or the like around an adhesive portion of the friction material and the backing metal.

[Embodiment of the Friction Member/Braking Pad]

Figure 1B:
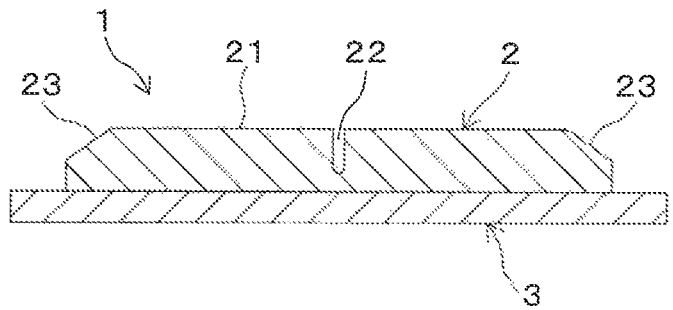
FIG. 1B is a cross sectional view along A-A in FIG. 1A in a case in which an adhesive layer having a specific thickness is not arranged.
Figure 1C:
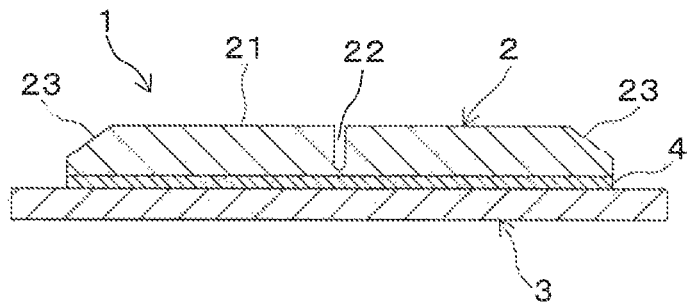
FIG. 1C is a cross sectional view along A-A in FIG. 1A in a case in which adhesive layer of a specific thickness is arranged.

FIGS. 1A to 1C show a braking pad 1 of disk brake for vehicles which is the friction member according to one embodiment of the present invention. This braking pad 1 is constructed by adhering a friction material 2 formed into tabular shape onto one surface of a tabular backing metal 3 made of cast iron. Surface 21 of the friction material 2 corresponds to a friction surface which is pressed and contacted to a disk rotor (not shown) which is a facing material. The entire braking pad 1 is formed in the shape of an arc so as to fit a circumferential direction of the disk rotor. At the central part of circumferential direction on the surface 21 side of the friction material 2, a slit 22 extending along radial direction is formed. At the both edge parts of the circumferential direction, chamfers 23 are formed.

The friction material 2 is formed with the abovementioned friction material composition. The braking pad 1 has a structure (2) or (3) which is explained in the above [Friction material]. FIG. 1B is a cross sectional view showing the structure (2). FIG. 1C is a cross sectional view showing the structure (3), and reference numeral 4 is an adhesive layer having a specific thickness arranged between the friction material 2 and the backing metal 3.

The braking pad 1 is produced as follows; the above kinds of raw materials are prepared and mixed to obtain the friction material composition; the friction material composition is preliminarily formed as the friction material 2; the preliminarily formed friction material is adhered to the backing metal 3; heating pressing forming is performed to the adhered friction material and backing metal; a necessary treatment (heat treatment, coating, scorch treatment, polishing treatment and the like) is performed; and the slit 22 and the chamfers 23 are formed on the friction material 2.

EXAMPLES

Hereinafter the friction material composition, friction material and friction member of the present invention are further explained in detail by way of Examples and Comparative Examples; however, the present invention is not limited thereto.

Examples 1 to 20 and Comparative Examples 1 to 6

(Preparation of Disk Brake Pad)

Each of the materials was added in an addition ratio shown in Tables 1 and 2, friction material composition of Examples 1 to 12 and Comparative Examples 1 to 4 were obtained. In addition, each of the materials was added in an addition ratio shown in Tables 3 and 4, friction material composition of Examples 13 to 20 and Comparative Examples 5 to 6 were obtained. The addition ratio in the Tables 1 to 4 is shown by mass % in the friction material composition. It should be noted that Comparative Examples 1 and 2 are shown in both Tables 2 and 4.

The friction material composition of Examples 1 to 20 and Comparative Examples 1 to 6 were mixed by a Loedige mixer (trade name: Loedige mixer M20, produced by MAT-SUBO corporation), and the mixtures obtained were preliminarily formed by a forming press (produced by Oji Machine Co., Ltd). The preliminarily formed materials obtained were formed while being heated and pressed together with an iron backing metal (produced by Hitachi Automotive Systems, Ltd.) by a forming press (produced by SANKI SEIKO CO., LTD.) at a forming temperature of 140 to 160° C., at a forming pressure of 30 MPa and for a forming time of 5 minutes. The formed products obtained were heat treated at 200° C. for 4.5 hours, and were polished by using a rotary polishing apparatus to obtain disk brake pads of Examples 1 to 20 and Comparative Examples 1 to 6. It should be noted that in Examples and Comparative Examples, the disk brake pads had thickness of the backing metal of 6 mm, thickness of the friction material of 11 mm, and projected area of the friction material of 52 $cm^2$.

With respect to the disk brake pads of Examples 1 to 20 and Comparative Examples 1 to 6, the following evaluations were performed and the results are shown in Tables 1 and 2.

(1) Evaluation of Rust Adhering Force

The rust adhering test was performed according to "rust adhering test method" in Japanese Industrial Standards (JIS) D4414. A case in which the rust adhering force was less than 50 N was evaluated as "Good", a case in which the rust adhering force was not less than 50 N and less than 100 N was evaluated as "Satisfactory" and a case in which the rust adhering force was not less than 100 N was evaluated as "Unsatisfactory" in Tables 1 to 4.

(2) Evaluation of Rust Delamination

After the rust adhering test, whether or not the rust delamination occurred in which surface of the friction material is delaminated and transferred to surface of disk rotor was observed. A case in which the rust delamination did not occur was evaluated as "Satisfactory" and a case in which the rust delamination occurred was evaluated as "Unsatisfactory". The results are also shown in Tables 1 to 4.

TABLE 1

| | Examples | | | | | | | |
|---|---|---|---|---|---|---|---|---|
| | 1 | 2 | 3 | 4 | 5 | 6 | 7 | 8 |
| Fibrillated aramid fiber (Twaron1095, produced by TEIJIN) | 5 | 5 | 5 | 5 | 5 | 2 | 2 | 8 |
| Sodium carbonate (average particle diameter 20 μm) | 0.5 | 0.8 | 1.5 | 0.5 | 0.5 | 0.5 | 1.5 | 0.5 |
| Calcium hydroxide (average particle diameter 20 μm) | 3 | 5 | 8 | 3 | 3 | 3 | 8 | 3 |
| Steel fiber ("#0", produced by GMT) | 0 | 0 | 0 | 5 | 0 | 0 | 0 | 0 |
| Potassium titanate having multiple convex portions (TerracessJP, produced by Otsuka Chemical Co., Ltd.) | 0 | 0 | 0 | 0 | 20 | 0 | 0 | 0 |
| Inorganic filler — Barium sulfate | 21.5 | 19.2 | 15.5 | 16.5 | 21.5 | 24.5 | 18.5 | 18.5 |
| Inorganic filler — Tin sulfide | 5 | 5 | 5 | 5 | 5 | 5 | 5 | 5 |
| Inorganic filler — Granular potassium titanate (TerracessTF-S, produced by Otsuka Chemical Co., Ltd.) | 20 | 20 | 20 | 20 | 0 | 20 | 20 | 20 |
| Inorganic filler — Zirconia (BR-QZ, produced by DAIICHI KIGENSO KAGAKU KOGYO CO., LTD.) | 10 | 10 | 10 | 10 | 10 | 10 | 10 | 10 |
| Inorganic filler — Mica | 5 | 5 | 5 | 5 | 5 | 5 | 5 | 5 |
| Inorganic filler — Graphite (T150, produced by TIMCAL) | 5 | 5 | 5 | 5 | 5 | 5 | 5 | 5 |
| Organic filler — Cashew dust | 5 | 5 | 5 | 5 | 5 | 5 | 5 | 5 |
| Organic filler — Tire rubber powder | 5 | 5 | 5 | 5 | 5 | 5 | 5 | 5 |
| Binder — Phenol resin | 10 | 10 | 10 | 10 | 10 | 10 | 10 | 10 |
| Fibrous substrate — Mineral fiber | 5 | 5 | 5 | 5 | 5 | 5 | 5 | 5 |
| Fibrous substrate — Copper fiber | 0 | 0 | 0 | 0 | 0 | 0 | 0 | 0 |
| Rust adhering force | Satisfactory | Satisfactory | Satisfactory | Good | Good | Satisfactory | Satisfactory | Satisfactory |
| Rust delamination | Satisfactory | Satisfactory | Satisfactory | Satisfactory | Satisfactory | Satisfactory | Satisfactory | Satisfactory |

TABLE 2

| | Examples | | | | Comparative Examples | | | |
|---|---|---|---|---|---|---|---|---|
| | 9 | 10 | 11 | 12 | 1 | 2 | 3 | 4 |
| Fibrillated aramid fiber (Twaron1095, produced by TEIJIN) | 8 | 5 | 5 | 5 | 5 | 5 | 5 | 5 |
| Sodium carbonate (average particle diameter 20 μm) | 1.5 | 0.8 | 0.8 | 0.8 | 0 | 0 | 0.5 | 0.5 |
| Calcium hydroxide (average particle diameter 20 μm) | 8 | 5 | 5 | 5 | 1.5 | 1.5 | 1.5 | 1.2 |
| Steel fiber ("#0", produced by GMT) | 0 | 3 | 7 | 0 | 0 | 0 | 0 | 0 |
| Potassium titanate having multiple convex portions (TerracessJP, produced by Otsuka Chemical Co., Ltd.) | 0 | 0 | 0 | 10 | 0 | 0 | 0 | 0 |
| Inorganic filler — Barium sulfate | 12.5 | 16.2 | 12.2 | 19.2 | 23.5 | 13.5 | 23 | 12.5 |
| Inorganic filler — Tin sulfide | 5 | 5 | 5 | 5 | 5 | 5 | 5 | 5 |
| Inorganic filler — Granular potassium titanate (TerracessTF-S, produced by Otsuka Chemical Co., Ltd.) | 20 | 20 | 20 | 10 | 20 | 20 | 20 | 20 |
| Inorganic filler — Zirconia (BR-QZ, produced by DAIICHI KIGENSO KAGAKU KOGYO CO., LTD.) | 10 | 10 | 10 | 10 | 10 | 10 | 10 | 10 |

TABLE 2-continued

|  |  | Examples | | | | Comparative Examples | | | |
| --- | --- | --- | --- | --- | --- | --- | --- | --- | --- |
|  |  | 9 | 10 | 11 | 12 | 1 | 2 | 3 | 4 |
|  | Mica | 5 | 5 | 5 | 5 | 5 | 5 | 5 | 5 |
|  | Graphite (T150, produced by TIMCAL) | 5 | 5 | 5 | 5 | 5 | 5 | 5 | 5 |
| Organic filler | Cashew dust | 5 | 5 | 5 | 5 | 5 | 5 | 5 | 5 |
|  | Tire rubber powder | 5 | 5 | 5 | 5 | 5 | 5 | 5 | 5 |
| Binder | Phenol resin | 10 | 10 | 10 | 10 | 10 | 10 | 10 | 10 |
| Fibrous substrate | Mineral fiber | 5 | 5 | 5 | 5 | 5 | 5 | 5 | 5 |
|  | Copper fiber | 0 | 0 | 0 | 0 | 0 | 10 | 0 | 0 |
|  | Rust adhering force | Satisfactory | Good | Good | Good | Unsatisfactory | Satisfactory | Satisfactory | Satisfactory |
|  | Rust delamination | Satisfactory | Satisfactory | Satisfactory | Satisfactory | Unsatisfactory | Satisfactory | Unsatisfactory | Unsatisfactory |

TABLE 3

|  |  | Examples | | | | | |
| --- | --- | --- | --- | --- | --- | --- | --- |
|  |  | 13 | 14 | 15 | 16 | 17 | 18 |
| Zinc powder (average particle diameter 50 μm) |  | 2 | 2 | 2 | 2 | 2 | 2 |
| Fibrillated aramid fiber (Twaron1095, produced by TEIJIN) |  | 5 | 5 | 5 | 5 | 5 | 5 |
| Sodium carbonate (average particle diameter 20 μm) |  | 2 | 2 | 2 | 0 | 0 | 0 |
| Calcium hydroxide (average particle diameter 20 μm) |  | 3 | 3 | 3 | 3 | 8 | 3 |
| Steel fiber ("#0", produced by GMT) |  | 4 | 0 | 4 | 0 | 0 | 0 |
| Potassium titanate having multiple convex portions (TerracessJP, produced by Otsuka Chemical Co., Ltd.) |  | 10 | 10 | 0 | 0 | 0 | 0 |
| Inorganic filler | Barium sulfate | 14 | 18 | 14 | 20 | 15 | 14 |
|  | Tin sulfide | 5 | 5 | 5 | 5 | 5 | 5 |
|  | Granular potassium titanate (TerracessTF-S, produced by Otsuka Chemical Co., Ltd.) | 10 | 10 | 20 | 20 | 20 | 20 |
|  | Zirconia (BR-QZ, produced by DAIICHI KIGENSO KAGAKU KOGYO CO., Ltd.) | 10 | 10 | 10 | 10 | 10 | 10 |
|  | Mica | 5 | 5 | 5 | 5 | 5 | 5 |
|  | Graphite (T150, produced by TIMCAL) | 5 | 5 | 5 | 5 | 5 | 5 |
| Organic filler | Cashew dust | 5 | 5 | 5 | 5 | 5 | 5 |
|  | Tire rubber powder | 5 | 5 | 5 | 5 | 5 | 5 |
| Binder | Phenol resin | 10 | 10 | 10 | 10 | 10 | 10 |
| Fibrous substrate | Mineral fiber | 5 | 5 | 5 | 5 | 5 | 5 |
|  | Copper fiber | 0 | 0 | 0 | 0 | 0 | 0 |
|  | Rust adhering force | Good | Good | Good | Satisfactory | Satisfactory | Good |
|  | Rust delamination | Satisfactory | Satisfactory | Satisfactory | Satisfactory | Satisfactory | Satisfactory |

TABLE 4

|  |  | Examples | | Comparative Examples | | | |
| --- | --- | --- | --- | --- | --- | --- | --- |
|  |  | 19 | 20 | 1 | 2 | 5 | 6 |
| Zinc powder (average particle diameter 50 μm) |  | 2 | 2 | 0 | 0 | 2 | 2 |
| Fibrillated aramid fiber (Twaron1095, produced by TEIJIN) |  | 5 | 5 | 5 | 5 | 5 | 5 |
| Sodium carbonate (average particle diameter 20 μm) |  | 0.5 | 4 | 0 | 0 | 0 | 0 |
| Calcium hydroxide (average particle diameter 20 μm) |  | 3 | 3 | 1.5 | 1.5 | 1.5 | 12 |
| Steel fiber ("#0", produced by GMT) |  | 4 | 4 | 0 | 0 | 0 | 0 |
| Potassium titanate having multiple convex portions (TerracessJP, produced by Otsuka Chemical Co., Ltd.) |  | 10 | 10 | 0 | 0 | 0 | 0 |
| Inorganic filler | Barium sulfate | 15.5 | 12 | 23.5 | 13.5 | 21.5 | 11 |
|  | Tin sulfide | 5 | 5 | 5 | 5 | 5 | 5 |
|  | Granular potassium titanate (TerracessTF-S, produced by Otsuka Chemical Co., Ltd.) | 10 | 10 | 20 | 20 | 20 | 20 |
|  | Zirconia (BR-QZ, produced by DAIICHI KIGENSO KAGAKU KOGYO CO., Ltd.) | 10 | 10 | 10 | 10 | 10 | 10 |

TABLE 4-continued

|  |  | Examples | | Comparative Examples | | | |
|---|---|---|---|---|---|---|---|
|  |  | 19 | 20 | 1 | 2 | 5 | 6 |
|  | Mica | 5 | 5 | 5 | 5 | 5 | 5 |
|  | Graphite (T150, produced by TIMCAL) | 5 | 5 | 5 | 5 | 5 | 5 |
| Organic filler | Cashew dust | 5 | 5 | 5 | 5 | 5 | 5 |
|  | Tire rubber powder | 5 | 5 | 5 | 5 | 5 | 5 |
| Binder | Phenol resin | 10 | 10 | 10 | 10 | 10 | 10 |
| Fibrous substrate | Mineral fiber | 5 | 5 | 5 | 5 | 5 | 5 |
|  | Copper fiber | 0 | 0 | 0 | 10 | 0 | 0 |
|  | Rust adhering force | Good | Good | Unsatisfactory | Satisfactory | Unsatisfactory | Satisfactory |
|  | Rust delamination | Satisfactory | Satisfactory | Unsatisfactory | Satisfactory | Unsatisfactory | Unsatisfactory |

In Examples 1 to 12 of the present invention, rust delamination did not occur and rust adhering force was low, in a manner that was similar to Comparative Example 2 containing copper. Furthermore, compared to Comparative Examples 1, 3 and 4 in which copper was not contained and content amount of sodium carbonate and calcium hydroxide did not satisfy the specific amount of the present invention, it was obvious that rust adhering force was low and rust delamination was difficult to occur in the friction material composition of the present invention.

In Examples 13 to 20 of the present invention, rust delamination did not occur and rust adhering force was low, in a manner similar to Comparative Example 2 containing copper. Furthermore, compared to Comparative Examples 1, 5 and 6 in which copper was not contained and content amount of calcium hydroxide did not satisfy the specific amount of the present invention, it was obvious that rust adhering force was low and rust delamination was difficult to occur in the friction material composition of the present invention.

By the friction material composition of the present invention, rust adhering force is low and rust delamination is restrained compared to a conventional product without using copper which is harmful to the environment. Therefore, it is desirable for the friction material and friction member such as braking pad for vehicles.

The invention claimed is:

1. A friction material composition comprising:
a binder wherein the binder comprises a phenol resin,
an organic filler,
an inorganic filler containing 0.5 to 1.5 mass % of sodium carbonate and 3 to 8 mass % of calcium hydroxide with respect to an entire friction material composition, and
a fibrous substrate containing fibrillated aramid fiber,
wherein the friction material composition contains no copper as an element, or contains not more than 0.5 mass % of copper with respect to the entire friction material composition.

2. The friction material composition according to claim 1, wherein the inorganic filler contains 1 to 30 mass % of potassium titanate having multiple convex portions with respect to the entire friction material composition.

3. The friction material composition according to claim 1, wherein the fibrous substrate consists of the fibrillated aramid fiber and optionally a mineral fiber.

4. The friction material composition according to claim 1, wherein the sodium carbonate and calcium hydroxide are in a form of powder having a particle diameter of not more than 100 μm.

5. The friction material composition according to claim 1, wherein the fibrillated aramid fiber has branched portions and a BET specific surface area of 5 to 15 m$^2$/g.

6. A friction material which is formed by forming the friction material composition according to claim 1.

7. A friction member formed by friction material formed by the friction material composition according to claim 1 and a backing metal.

* * * * *